(12) United States Patent
Kaplan et al.

(10) Patent No.: US 10,367,688 B2
(45) Date of Patent: Jul. 30, 2019

(54) DISCOVERING CHANGES OF NETWORK INTERFACE CONTROLLER NAMES

(71) Applicant: Red Hat Israel, Ltd., Raanana (IL)

(72) Inventors: Alona Kaplan, Raanana (IL); Michael Kolesnik, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 405 days.

(21) Appl. No.: 15/238,958

(22) Filed: Aug. 17, 2016

(65) Prior Publication Data
US 2018/0054357 A1 Feb. 22, 2018

(51) Int. Cl.
*H04L 12/24* (2006.01)
*H04L 29/12* (2006.01)

(52) U.S. Cl.
CPC ...... *H04L 41/0816* (2013.01); *H04L 41/0853* (2013.01); *H04L 61/6022* (2013.01)

(58) Field of Classification Search
CPC ............. H04L 41/0816; H04L 61/6022; H04L 41/0853
See application file for complete search history.

(56) References Cited

U.S. PATENT DOCUMENTS

| 7,971,203 | B2* | 6/2011 | Lantz | ................. G06F 9/45558 711/6 |
| 8,909,742 | B2 | 12/2014 | Enstone et al. | |
| 8,948,029 | B2 | 2/2015 | Gospodarek et al. | |
| 2014/0123140 | A1 | 5/2014 | Motoki | |
| 2014/0289728 | A1* | 9/2014 | Mitsunobu | .......... G06F 9/45558 718/1 |
| 2015/0110122 | A1 | 4/2015 | Fenkes et al. | |
| 2015/0200808 | A1 | 7/2015 | Gourlay et al. | |
| 2017/0149653 | A1* | 5/2017 | Leitner | ............... G06F 9/45558 |

(Continued)

FOREIGN PATENT DOCUMENTS

TW 201327394 A 7/2013

OTHER PUBLICATIONS

"Determining NIC Designation from PCI Address", http://unix.stackexchange.com/questions/46800/determining-nic-designation-from-pci-address, 2 pages, 2012.

(Continued)

*Primary Examiner* — Abdullahi E Salad
(74) *Attorney, Agent, or Firm* — Lowenstein Sandler LLP

(57) ABSTRACT

Systems and methods for discovering changes of network interface controller (NIC) names are disclosed. An example method may comprise receiving new network configuration data comprising first network interface controller (NIC) configuration data for a NIC device that is identified by a permanent identifier (ID), identifying the permanent ID of the NIC device in current network configuration data comprising second NIC configuration data for the NIC device, responsive to a first NIC name corresponding to the permanent ID in the new network configuration data being different than a second NIC name corresponding to the permanent ID in the current network configuration data, updating, by a processing device, the first NIC configuration data in the new network configuration data to be the same as the second NIC configuration data, and saving, by the processing device, the updated new network configuration data as the current network configuration data.

20 Claims, 7 Drawing Sheets

(56) References Cited

U.S. PATENT DOCUMENTS

2018/0006958 A1* 1/2018 Olmsted-Thompson .................... H04L 67/1034
2018/0007162 A1* 1/2018 Olmsted-Thompson .................... H04L 67/2852

OTHER PUBLICATIONS

"13.2. Using SR-IOV", https://access.redhat.com/documentation/en-US/Red_Hat_Enterprise_Linux/6/html/Virtualization_Host_Configuration_and_Guest_Installation_Guide/sect-Virtualization_Host_Configuration_and_Guest_Installation_Guide-SR_IOV-How_SR_IOV_Libvirt_Works.html, 8 pages, [retrieved from the internet on Aug. 17, 2016].
"Bug 1061672—Unexpected NICs Rename after Nde Approval", https://bugzilla.redhat.com/show_bug.cgi?id=1061672, Laercio Motta, Feb. 5, 2014, 4 pages.
"Unexpected NIC Naming f23 Firewall Implications", https://lists.fedoraproject.org/pipermail/devel/2015-November/216610.html, Reindl Harald, Nov. 8, 2015, 2 pages.
"Predictable Network Interface Names", https://www.freedesktop.org/wiki/Software/systemd/PredictableNetworkInterfaceNames/, Nov. 12, 2015, 3 pages.
"Network Interface Name Changes after Update to 15.10—Udev Changes", http://askubuntu.com/questions/689070/network-interface-name-changes-after-update-to-15-10-udev-changes, 3 pages, [retrieved from the internet on Aug. 17, 2016].

* cited by examiner

Network Configuration Data Table 200
(Initial)

| NIC Name 202 | Permanent ID 204 | Logical Networks 206 | SR-IOV Config ID 208 |
|---|---|---|---|
| ETH0 | HW ID 100 | Red | 1 |
| ETH1 | HW ID 101 | Blue | None |
| ETH2 | HW ID 102 | Green, Purple | None |

FIG. 2A

Network Configuration Data Table 210
(Broken Configuration)

| NIC Name 202 | Permanent ID 204 | Logical Networks 206 | SR-IOV Config ID 208 |
|---|---|---|---|
| ETH0 | HW ID 102 | Red | 1 |
| ETH1 | HW ID 100 | Blue | None |
| ETH2 | HW ID 101 | Green, Purple | None |

FIG. 2B

Network Configuration Data Table 220
(Updated Configuration)

| NIC Name 202 | Permanent ID 204 | Logical Networks 206 | SR-IOV Config ID 208 |
|---|---|---|---|
| ETH0 | HW ID 102 | Green, Purple | None |
| ETH1 | HW ID 100 | Red | 1 |
| ETH2 | HW ID 101 | Blue | None |

FIG. 2C

DISCOVERING CHANGES OF NETWORK INTERFACE CONTROLLER NAMES

TECHNICAL FIELD

The disclosure is generally related to network devices, and is more specifically related to discovering changes of network interface controller names.

BACKGROUND

Network interface controllers (NICs) are computer hardware components that connect a computing device to a network. The NIC implements electronic circuitry used to communicate via a physical layer and data link layer standard, such as Ethernet, Fibre Channel, Wi-Fi, or Token Ring, to name a few examples. The NIC implements the Open Systems Interconnection (OSI) layer 1 (physical layer) and OSI layer 2 (data link layer) standards, thus providing physical access to a networking medium and a low-level addressing system using media access control (MAC) addresses, in order to allow computing devices to communicate over a wired or wireless network.

BRIEF DESCRIPTION OF THE DRAWINGS

The disclosure is illustrated by way of examples, and not by way of limitation, and may be more fully understood with references to the following detailed description when considered in connection with the figures, in which:

FIGS. 2A through 2C illustrates example tables depicting networking configurations that are updated by discovering changes of NIC names in accordance with one or more aspects of the disclosure;

DETAILED DESCRIPTION

Figure 1:
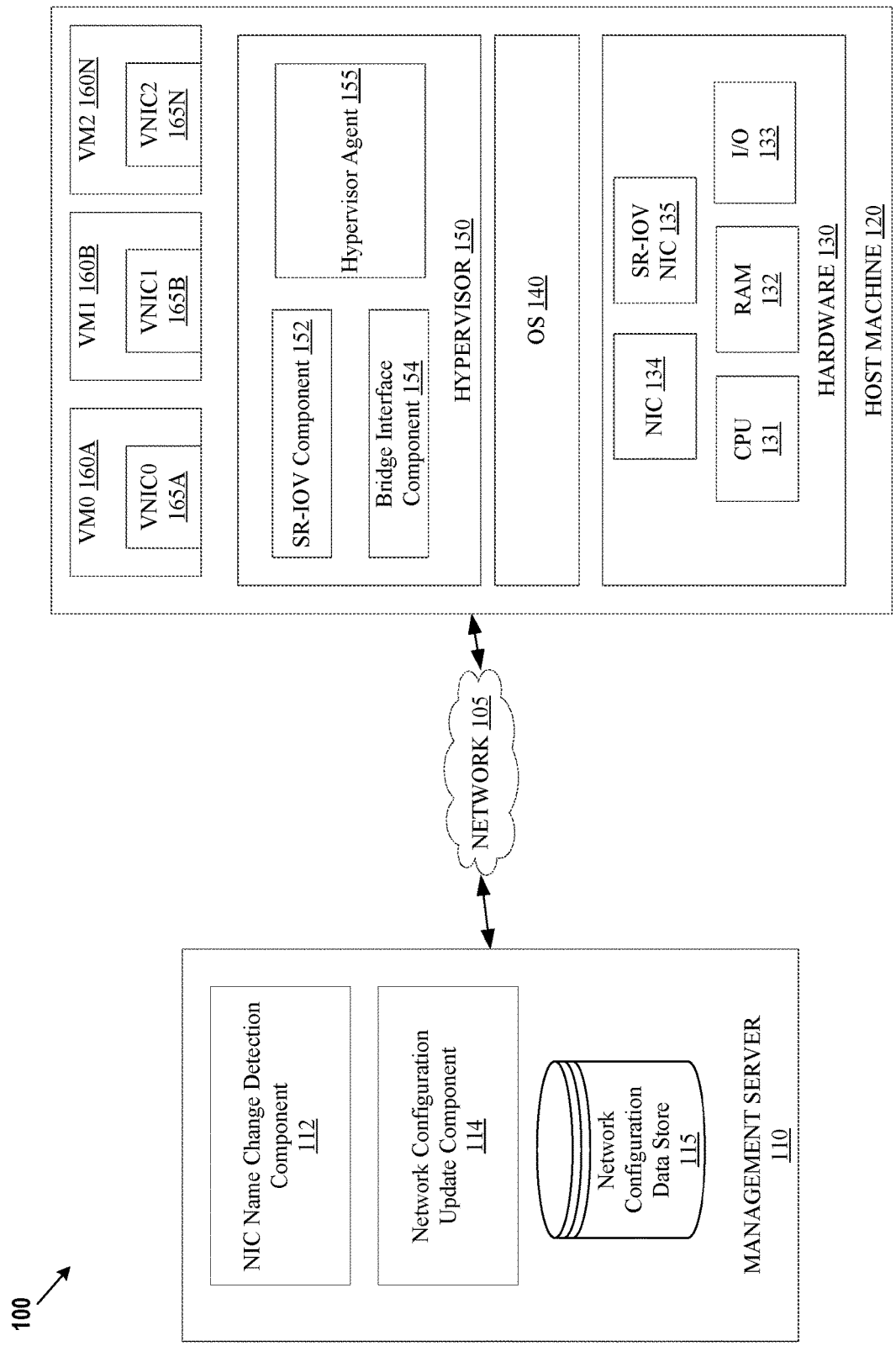
FIG. 1 depicts a block diagram of an example system architecture for discovering changes of network interface controller (NIC) names in accordance with one or more aspects of the disclosure.

Described herein are methods and systems for discovering changes of network interface controller (NIC) names. A computing device may be equipped with one or more NICs providing physical access to a networking medium and a low level addressing system (e.g., using media access control (MAC) addresses), in order to allow the computer system to communicate over a wired or wireless network. In networking configurations maintained by one or more computing devices in a networking system, the NIC may be identified by a NIC name. The NIC name is an identifier of the NIC device in the networking system. In some cases, the NIC name can change, for example due to computer-readable instruction-implemented software errors (e.g., bugs) and/or changes of hardware unrelated to the NIC device itself. A change of the NIC name can have repercussions on system behavior without a user (e.g., an administrator) being aware of it.

Implementations of the disclosure provide a capability for computing systems to detect NIC name changes and address the NIC name changes without user intervention. In one implementation, a NIC device is identified by a permanent identifier (ID), in addition to its NIC name, where the permanent ID is an immutable ID for the NIC device. The permanent ID may include, but is not limited to, a peripheral component interconnect (PCI) address, a hardcoded MAC address, a hardware ID of the NIC device (e.g., serial number), or any other ID that can identify the NIC device even if the NIC name has changed.

A computing device can monitor networking devices of the computing device or networking devices of other computing devices that the computing device manages. When the computing device detects that a new version of networking configuration data of the monitored networking devices is not the same as a previous version of the networking configuration data, the computing device can utilize the permanent ID of the NIC device to alter and/or update the networking configuration data for the NIC device to be in a correct state. In some implementations, altering and/or updating the networking configuration data may include remapping networks to a correct NIC, fixing single-root-input/output virtualization (SR-IOV) configurations, causing bridges to be remapped to the correct NIC, and so on.

Implementations of the disclosure may further apply to a management server monitoring one or more host devices (also referred to herein as "host machines") executing virtual machines (VMs) managed by a hypervisor of the host device. The management server may analyze networking device (e.g., NIC device) configurations (provided by the hypervisor to the management server) of the VMs managed by the hypervisor, may detect NIC name changes based on a permanent ID of the NIC device, and may fix networking configurations for the host devices and its VMs based on any detected NIC name changes.

In conventional systems, solutions are provided to name NICs in a consistent way. However, the conventional systems do not provide a way to discover when a NIC name change has occurred and/or correct the configuration errors resulting from the NIC name change. Conventional systems provide for solutions to identify NIC devices with an ID that does not change, but do not provide a solution for how to handle the occurrence of a NIC name change without user intervention. Implementations of the disclosure provide a process to identify occurrence of NIC name changes and fix networking configuration errors resulting from the NIC name change without user intervention.

FIG. 1 is an example networked system architecture 100 in which implementations of the disclosure can be implemented. Networked system architecture 100 may include a management server 110 communicably coupled to a host machine 120 via a network 105.

Host machine 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, computer-readable instruction-implemented software components, and/or hardware components. Host machine 120 may include hardware 130, such as one or more processors (also referred to as central processing units (CPUs)) 131 communicatively coupled to memory devices (such as random access memory (RAM)) 132, input/output (I/O) device(s) 133, a NIC 134, and a SR-IOV NIC 135, which may all be communicably coupled via a system bus (not shown).

"Processor" or "CPU" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). As mentioned above, a processor may also be referred to as a CPU. "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

In one implementation, host machine 120 may be part of a virtualization system. Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple VMs in order to improve the hardware utilization rate.

Host machine 120 may execute one or more VMs 160A-160N, by executing a computer-readable instruction-implemented software layer 150, often referred to as "hypervisor" or a "virtual machine manager (VMM)", above the hardware 120 and below the VMs 160A-160N, as schematically illustrated by FIG. 1. In one illustrative example, hypervisor 150 may be a component of operating system 140 executed by the hardware 130 of host machine 120. Alternatively, hypervisor 150 may be provided by an application running under host operating system 140, or may run directly on host computer system 120 without an operating system 140 beneath it.

Hypervisor 150 may abstract the physical layer (i.e., hardware 130), including processors 131, memory 132, and I/O devices 133, and present this abstraction to VMs 160A-160B as virtual devices. Device virtualization may be implemented by intercepting virtual machine memory read/write and/or input/output (I/O) operations with respect to certain memory and/or I/O port ranges, and by routing hardware interrupts to a VM 160A-160N associated with the corresponding virtual device. Hypervisor 150 may provide interfaces between the underlying hardware 130 and virtual devices of VMs 160A-160N. A VM 160A-160N may execute a guest operating system (not shown) which may utilize underlying virtual processors (also referred to as virtual central processing units (vCPUs)), virtual memory, and virtual I/O devices. In one implementation, a virtual I/O device may refer to a virtual NIC (VNIC) 165A-165N of the VM 160A-160N. One or more applications may be running on a VM 160A-160N under a guest operating system.

As discussed above, VM 160A-160N may be associated with various I/O devices of the underlying host machine 120, such as disk drive controllers, graphics cards, network interface cards, sound cards, etc. For example, VM 160A-160N may be associated with one or more of NIC 134 and/or SR-IOV NIC 135 of host machine 120. Hypervisor 150 may provide virtual networking for VMs 160A-160N to provide connectivity to a network via NIC 134 and/or SR-IOV NIC 135. For ease of explanation, FIG. 1 is illustrated as showing both NIC 134 and SR-IOV NIC 135. In some implementations, host machine 120 may be implemented with either one or the other of NIC 134 or SR-IOV NIC 135.

In some implementations, hypervisor 150 may implement virtual networking via a virtual switch, such as a bridge. A bridge is a component (e.g., computer-readable instructions implementing software) used to unite two or more network segments. A bridge behaves similar to a virtual network switch, working transparently (e.g., other machines do not know about its existence). Both real and virtual devices may be connected to a bridge. Hypervisor 150 may include a bridge interface component 154 to provide the functionality of a bridge for the hypervisor 150 and VMs 160A-160N that it manages. The bridge interface component 154 may connect VNICs 165A-165N of VMs 160A-160N to the NIC 134 of host machine 120, in order to provide network connectivity to the VM 160A-160N.

In certain implementations, the hypervisor 150 may implement virtual networking via a single-root I/O virtualization (SR-IOV)-enabled NIC 135. Hypervisor 150 may support the SR-IOV specification, which allows two or more VMs 160A-160N to share a single physical device (e.g., SR-IOV NIC 135). Hypervisor 150 may include a SR-IOV component 152 that provides SR-IOV specification support. Virtual networking with an SR-IOV-enabled NIC 135 may be referred to as supporting a pass-through mode for assigning I/O devices, such as SR-IOV NIC 135, to VMs 160A-160N.

When associating SR-IOV NIC 135 to VMs 160A-160N, the (SR-IOV) specification, which uses physical function (PFs) and virtual functions (VFs), is utilized. PFs are full-featured Peripheral Component Interconnect Express (PCIe) devices that may include configuration resources and capabilities for the I/O device. VFs are "lightweight" PCIe functions that contain the resources for data movement, but may have a minimized set of configuration resources. Each VF is derived from a corresponding PF. The number of VFs that may be supported by a given device may be limited by the device hardware. In an illustrative example, a single Ethernet port may be mapped to multiple VFs that can be shared by one or more VMs 160A-160N. An I/O device associated with a VM 160A-160N (e.g., a VNIC 165A-165N) may be provided by a VF, thus bypassing the virtual networking on the host in order to reduce the latency between the VM 160A-160N and the underlying SR-IOV NIC 135. The SR-IOV component 152 of hypervisor 150 is used to detect and initialize PFs and VFs correctly and appropriately.

Hypervisor 150 may assign one or more VFs to a VM 160A-160N, by utilizing SR-IOV component 152 to map the configuration space of each VF to the guest memory address range associated with the VM 160A-160N. Each VF may be assigned to a single VM 160A-160N, as VFs utilize real hardware resources. A VM 160A-160N may have multiple VFs assigned to it. A VF appears as a network card in the same way as a normal network card would appear to an operating system. VFs may exhibit a near-native performance and thus may provide better performance than para-virtualized drivers and emulated access. VFs may further provide data protection between VMs 160A-160N on the same physical server as the data is managed and controlled by the hardware.

Host machine 120 may be communicably coupled to a management server 110 via network 105. Network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Management server 110 may be one or more computing devices (such as a rackmount server, a router computer, a server computer, a personal computer, a mainframe computer, a laptop computer, a tablet computer, a desktop computer, etc.), data stores (e.g., hard disks, memories, databases, etc.), networks, software components, and/or hardware components.

Management server 110 may act as a host controller for one or more host machine, such as host machine 110. A host controller may monitor and control host machines, and may further manage VMs (e.g., VMs 160A-160N) executing on host machines. A host controller may manage one or more of provisioning of new VM, connection protocols between clients and VMs, user sessions (e.g., user authentication and verification, etc.), backup and restore, image management, virtual machine migration, load balancing, and so on. A host controller may add a VM, delete a VM, balance the load on the host cluster, provide directory service to the VMs, and/or perform other management functions.

In implementations of the disclosure, a NIC name associated with NIC 134 or SR-IOV NIC 135 may change. A change in a NIC name may be caused by a variety of events, such as an error in execution of software instructions or a change in hardware unrelated to the NIC device. Management server 110 may discover and address this change of NIC name on managed host machines, such as host machine 120, of the network system architecture 100. Management server 110 may include a NIC name change detection component 112, a network configuration update component 114, and a network configuration data store 115. More or less components may reside on management server 110 without affecting functionality of implementations of the disclosure.

In one implementation, the data store 115 may be a memory (e.g., random access memory), a cache, a drive (e.g., a hard drive), a flash drive, a database system, or another type of component or device capable of storing data. The data store 115 may also include multiple storage components (e.g., multiple drives or multiple databases) that may also span multiple computing devices (e.g., multiple server computers). Although data store 115 is illustrated as residing within management server 110, in some implementations of the disclosure data store 115 may be located external to management server 110.

The NIC name change detection component 112 may monitor for hardware change events sent to the management server 110. In some implementations, a hypervisor agent 155 sends a notification to the management server 110 of an event. The event may be sent with a corresponding request for the management server 110 to request a device list from the hypervisor 150. In other implementations, the event itself is a trigger for the management server 110 to send a request for the device list. In certain implementations, hypervisor agent 155 may be implemented as instructions that provide a software component invoked by hypervisor 150. The hypervisor agent 155 may be implemented as an intermediary to interface between the management server 110 and the hypervisor 150.

The event sent by the hypervisor agent 155 may be associated with a re-start of the hypervisor 150, a re-start of the hypervisor agent 155, an occurrence of a network or hardware change at the hypervisor (e.g., new VM added, VM removed, VM update, etc.), and so on. In response to the received event, the management server 110 sends a request for a device list to the hypervisor 150. In some implementations, the request for the device list may be sent from the management server 110 at predetermined intervals without receiving an event from the hypervisor agent 155. In other implementations, sending of the request for the device list may be manually triggered by a user (e.g., system administrator) of the management server 110.

In one implementation, the device list may include device configuration information and network configuration information for all devices (e.g., virtual devices) managed by the hypervisor 150. The device list may include network configuration information corresponding to VNICs 165A-165N of VMs 160A-160N. When an updated device list is received at the management server 110, the NIC name change detection component 112 compares the new network configuration information in the received device list to current network configuration information maintained, for example, in the network configuration data store 115.

NIC name change detection component 112 utilizes a permanent ID of a NIC device for the comparison. The permanent ID may be an identifier of the NIC device that is immutable (i.e., does not change), such as a PCI address, hardcoded MAC address, hardware ID (e.g., serial number), or any other ID that can identify the NIC even if the NIC name has changed.

When a NIC in the new network configuration information has the same permanent ID as a NIC in the current network configuration information, then the NIC name change detection component 112 determines whether the NIC devices with the same permanent ID have the same NIC name. If the NIC devices have the same NIC name as well, then no further action is taken. On the other hand, if the NIC devices have the same permanent ID, but different NIC names, then network configuration update component 114 is invoked to update the current networking configuration information to be in a correct state.

The network configuration update component 114 may remap logical networks to a correct NIC, fix single-root-input/output virtualization (SR-IOV) configurations, and/or cause bridges and network labels to be remapped to the correct NIC at the host machine 120. The network configuration update component 114 may utilize the current network configuration information to determine which logical networks belong to which updated NIC names and where the correct SR-IOV configurations should be associated in the new network configuration information.

FIGS. 2A, 2B, and 2C depict example network configuration data tables illustrating the changes in networking configuration cause by a NIC name change and the associated configuration update applied by a management server, according to implementations of the disclosure. FIG. 2A depicts a network configuration table 200 showing an "initial" (i.e., current) network configuration maintained by a management server 110 (e.g., in network configuration data store 115) of FIG. 1. As shown, network configuration table 210 includes columns for NIC name 202, permanent ID 204, logical networks 206, and SR-IOV configuration ID 208.

A logical network 206 is a virtual representation of a network that appears to the user as an entirely separate and self-contained network even though it might physically be only a portion of a larger network or a local area network. A logical network 206 may also be an entity that has been created out of multiple separate networks and made to appear as a single network. This is often used in virtual environments where there are physical and virtual networks running together; so, out of convenience and function, separate networks can be made into a single logical network. In some implementations, logical networks 206 may be identified by network labels.

SR-IOV configuration ID 208 may refer to an ID of a configuration that defines the list of networks that the SR-IOV physical NIC has connectivity to and the number of VFs of the SR-IOV NIC. In some implementations, the logical network 206 and SR-IOV configuration ID 208 are together referred to herein a "NIC configuration data." More or less columns may be included in network configuration table 210, and are not limited to the depiction illustrated and described herein.

In response to an event (e.g., re-start hypervisor, re-start hypervisor agent, new VM added, etc.), the management server 110 receives new networking configuration information from the hypervisor as depicted in the "broken configuration" of network configuration table 210 in FIG. 2B. The NIC name change detection component 112 of management server 110 may compare the initial (i.e., current) network configuration data in table 200 of FIG. 2A to the new ("broken") network configuration data in table 210 of FIG. 2B. Based on the comparison, the NIC name change detection component 112 determines that the NIC device associated with the permanent ID 204 of HW ID 100 has changed NIC names 202 from ETH0 (in table 200) to ETH1 (in table 210), the NIC device associated with the permanent ID 204 of HW ID 101 has changed NIC names 202 from ETH1 (in table 200) to ETH2 (in table 210), and the NIC device associated with the permanent ID 204 of HW ID 102 has changed NIC names 202 from ETH2 (in table 200) to ETH0 (in table 210). However, the logical network(s) 206 and SR-IOV configuration ID 208 associated with the permanent ID 204 for the NIC device in table 200 have not been correspondingly updated in table 210 (and thus may result in unexpected behavior in the system and, potentially, system failures). As shown in table 210 of FIG. 2B, the logical networks 206 and SR-IOV configuration ID 208 have remained associated with the original NIC name 202 from table 200.

Upon detecting the change in NIC names (but not corresponding permanent IDs), the management server 110 causes the networking configuration data (maintained by the management server) for each NIC device to be updated according to the updated configuration shown in network configuration table 220 of FIG. 2C. The network configuration update component 114 may determine the logical networks 206 and SR-IOV configuration ID 208 previously-associated with the permanent ID 204 in the initial configurations of table 200, and update the logical networks 206 and SR-IOV configuration ID 208 to be consistent with the initial (current) network configurations found in table 200 for the associated permanent ID 204.

For example, for NIC name 202 ETH0 (which corresponds to permanent ID 204 "HW ID 102"), the logical network 206 of "Red" that is shown in table 210 is changed to logical networks 206 "Green" and "Purple" in table 220. This is consistent with the logical networks 206 corresponding to the "HW ID 102" permanent ID 204 found in table 200. In addition, the SR-IOV configuration ID 208 is also updated to be consistent with the configurations found in table 200 for the associated permanent ID 204. Similar changes are made for NIC names 202 ETH1 and ETH2 as shown in table 220. In one implementation, the updated network configuration data of table 220 is saved as the current network configuration data at the management server.

In one implementation, in order to update the new ("broken") network configuration data, the network configuration update component 114 may first fetch the current ("initial") network configuration data into a local cache of the management server. Then, the network configuration update component 114 may unlink (in the new network configuration data) all logical networks 206 that were connected to the NIC device in the database (i.e., data store 115). Subsequently, the network configuration update component 114 may link (in the new network configuration data) all logical networks 206 that should be connected to the NIC device (as deduced from the current network configuration data stored in the local cache). Furthermore, the network configuration update component 114 may restore the SR-IOV state similar to the above process. The updated new network configuration data may then be stored in the network configuration data store 115 as the current network configuration data.

In addition to the logical network configuration updates made by the management server 110 in its data stores (e.g., network configuration data store 115), the network configuration update component 114 may also generate and send commands (e.g., instructions) to the hypervisor 150 to cause the hypervisor 150 to update NIC configuration data (e.g., any network labels and bridges) corresponding to the detected changed NIC names. The generated command identifies the particular NIC name(s) and permanent IDs that require configuration changes, as well as the specific changes (e.g., moving bridge(s) to another NIC device) that should be made by the hypervisor 150. In one implementation, the bridge interface component 154 of hypervisor 150 may assist in applying the indicated NIC configuration changes (e.g., moving bridge(s) to correct NIC name). These identified changes are consistent with the changes made in the management server's 110 own network configurations as described above. In response, the hypervisor 150 makes the indicated changes as directed by the management server 110.

Figure 3:
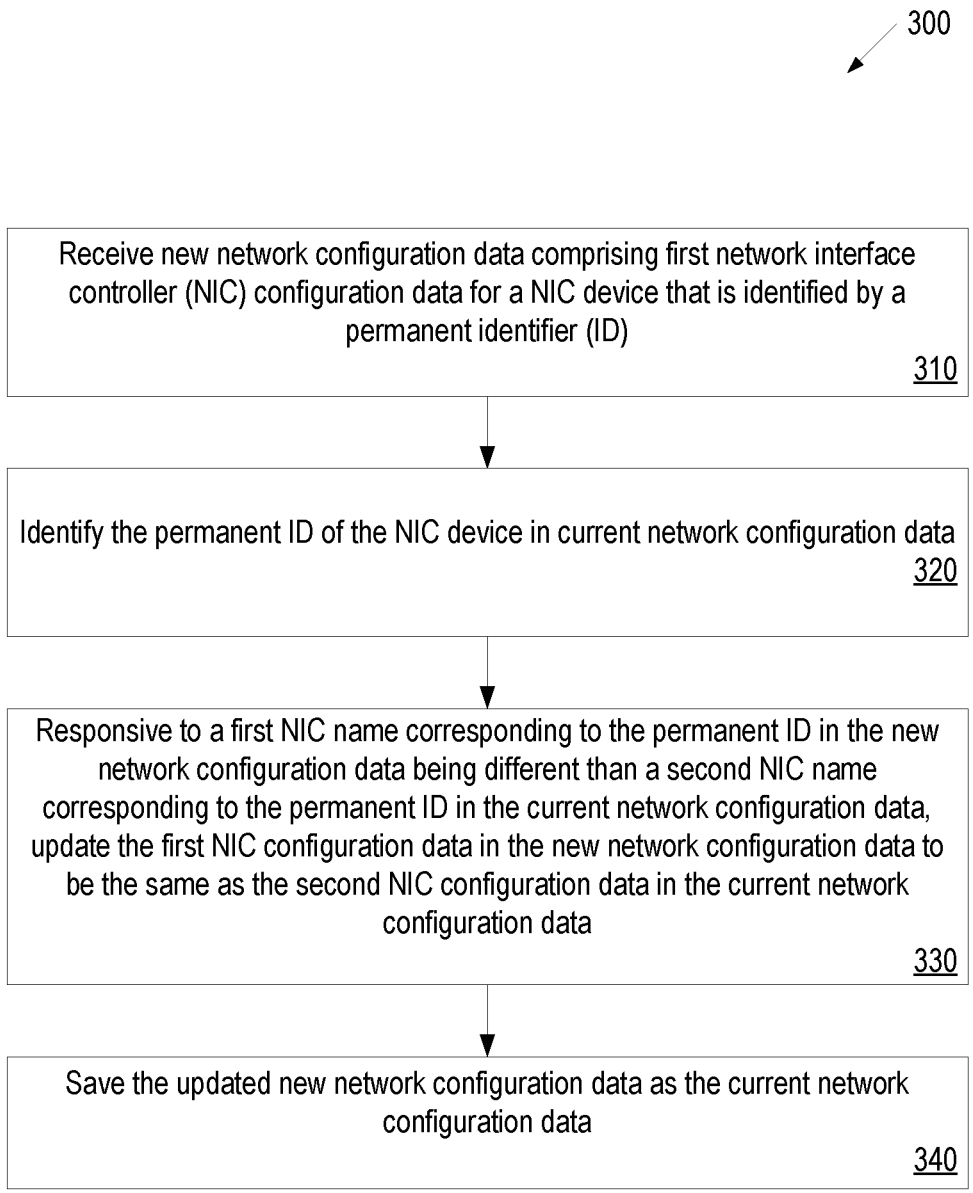
FIG. 3 depicts a flow diagram of a method for discovering changes of NIC names, in accordance with one or more aspects of the disclosure.
Figure 4:
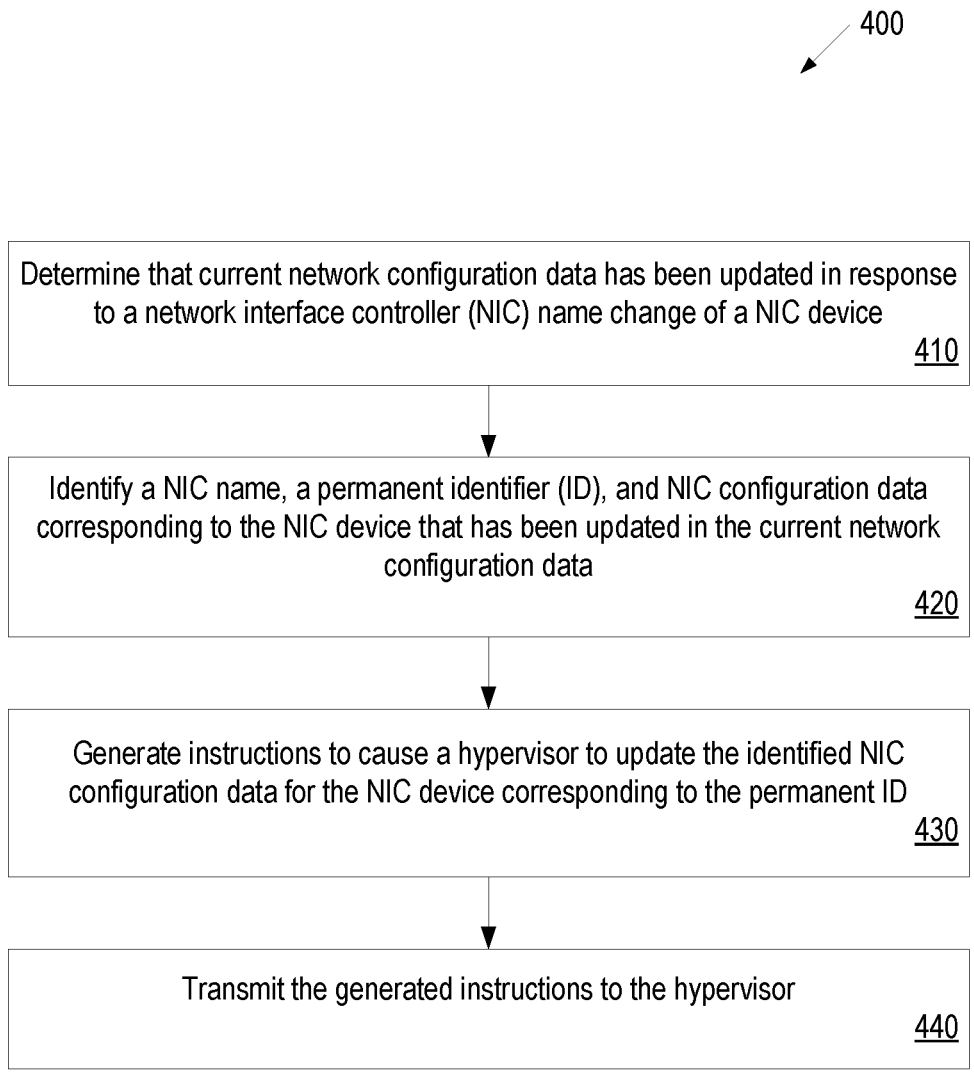
FIG. 4 depicts a flow diagram of another method for discovering changes in NIC names, in accordance with one or more aspects of the disclosure.

FIGS. 3 and 4 depict flow diagrams for illustrative examples of methods 300 and 400 for discovering changes of NIC names and addressing the NIC name changes without user intervention. Method 300 includes a method of discovering a NIC name change and responsively updating network configurations, according to implementations of the disclosure. Method 400 includes a method of instructing a hypervisor of a host machine to update NIC network configurations in response to discovery of a NIC name change, according to implementations of the disclosure. Methods 300 and 400 may be performed by processing devices that may comprise hardware (e.g., circuitry, dedicated logic), computer readable instructions (e.g., run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by a management server, such as management server 110, as shown in FIG. 1.

Referring to FIG. 3, method 300 may be performed by processing devices of a computing device and may begin at block 310. At block 310, a processing device may receive new network configuration data comprising first NIC configuration data for a NIC device that is identified by a permanent ID. At block 320, the processing device may identify the permanent ID of the NIC device in current network configuration data. At block 330, the processing device may, responsive to a first NIC name corresponding to the permanent ID in the new network configuration data being different than a second NIC name corresponding to the permanent ID in the current network configuration data, update the first NIC configuration data in the new network configuration data to be the same as the second NIC configuration data in the current network configuration data. At block 340, the processing device may save the updated new network configuration data as the current network configuration data.

Referring to FIG. 4, method 400 may be performed by processing devices of a computing device and may begin at block 410. At block 410, a processing device may determine that current network configuration data has been updated in response to a NIC name change of a NIC device. At block 420, the processing device may identify a NIC name, a permanent ID, and NIC configuration data corresponding to the NIC device that has been updated in the current network configuration data. At block 430, the processing device may generate instructions to cause a hypervisor to update the identified NIC configuration data for the NIC device corresponding to the permanent ID. At block 440, the processing device may transmit the generated instructions to the hypervisor.

Figure 5:
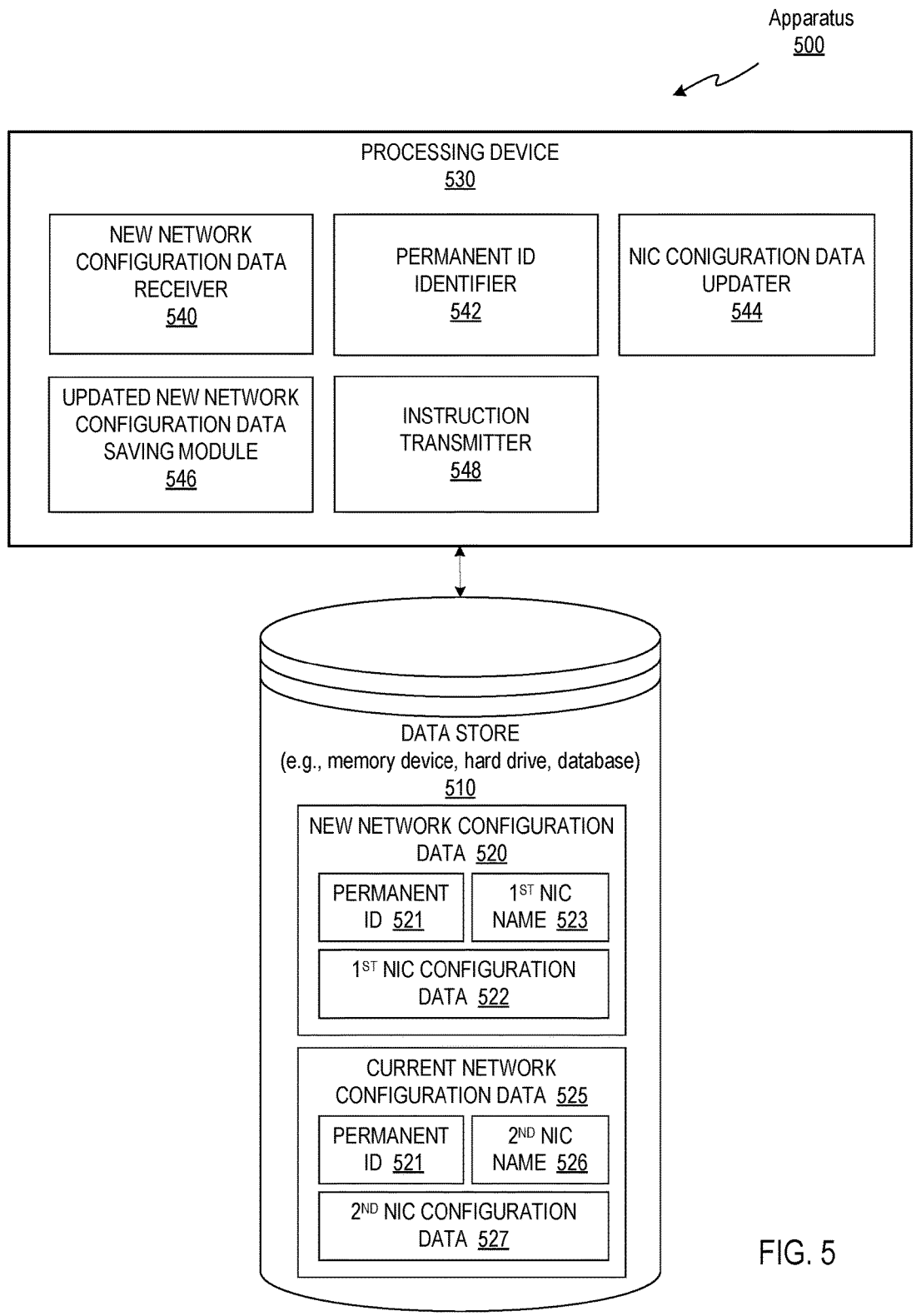
FIG. 5 illustrates an example apparatus in which implementations of the disclosure may operate.

FIG. 5 illustrates an example apparatus 500 in which implementations of the disclosure may operate. The apparatus 500 may be the same or similar to one of the management server 110, the NIC name change detection component 112, the network configuration data store 115 within management server 110 (FIG. 1), or other computing device within the networked system architecture 100. Apparatus 500 may include components and modules for performing discovering changes of NIC names. The apparatus 500 may include a data store 510 that can store new network configuration data 520 and current network configuration data 525. The data store 510 may include any non-persistent data storage (e.g., memory), persistent data storage (e.g., flash storage, hard drive, tape), other medium, or combination thereof that is capable of storing instructions for carrying out the operations of the components and module discussed herein. The apparatus 500 may include components and modules for discovering NIC name changes in a network system. The apparatus 500 may include a processing device 530 with a new network configuration data receiver 540, a permanent ID identifier 542, a NIC configuration data updater 544, an updated new network configuration data saving module 546, and an instruction transmitter 548.

The new network configuration data received 542 can receive new network configuration data comprising first NIC configuration data 522 for a NIC device that is identified by a permanent ID 521. The received new network configuration data may be stored as new network configuration data 520 in the data store 510. The permanent ID identifier 542 may identify the permanent ID 521 of the NIC device in current network configuration data 525 stored in the data store 510. The NIC configuration data updater 544 may, responsive to a first NIC name 523 corresponding to the permanent ID 521 in the new network configuration data 520 being different than a second NIC name 526 corresponding to the permanent ID 521 in the current network configuration data 525, update the first NIC configuration data 522 in the new network configuration data 520 to be the same as the second NIC configuration data 527 in the current network configuration data 525. The updated new network configuration data saving module 546 may save the updated new network configuration data 520 as the current network configuration data 527. The instruction transmitter 548 may transmit instructions to a host machine hosting the NIC device, the instructions to cause NIC configuration of the NIC device to be updated consistent with the saved current network configuration data 525.

Figure 6:
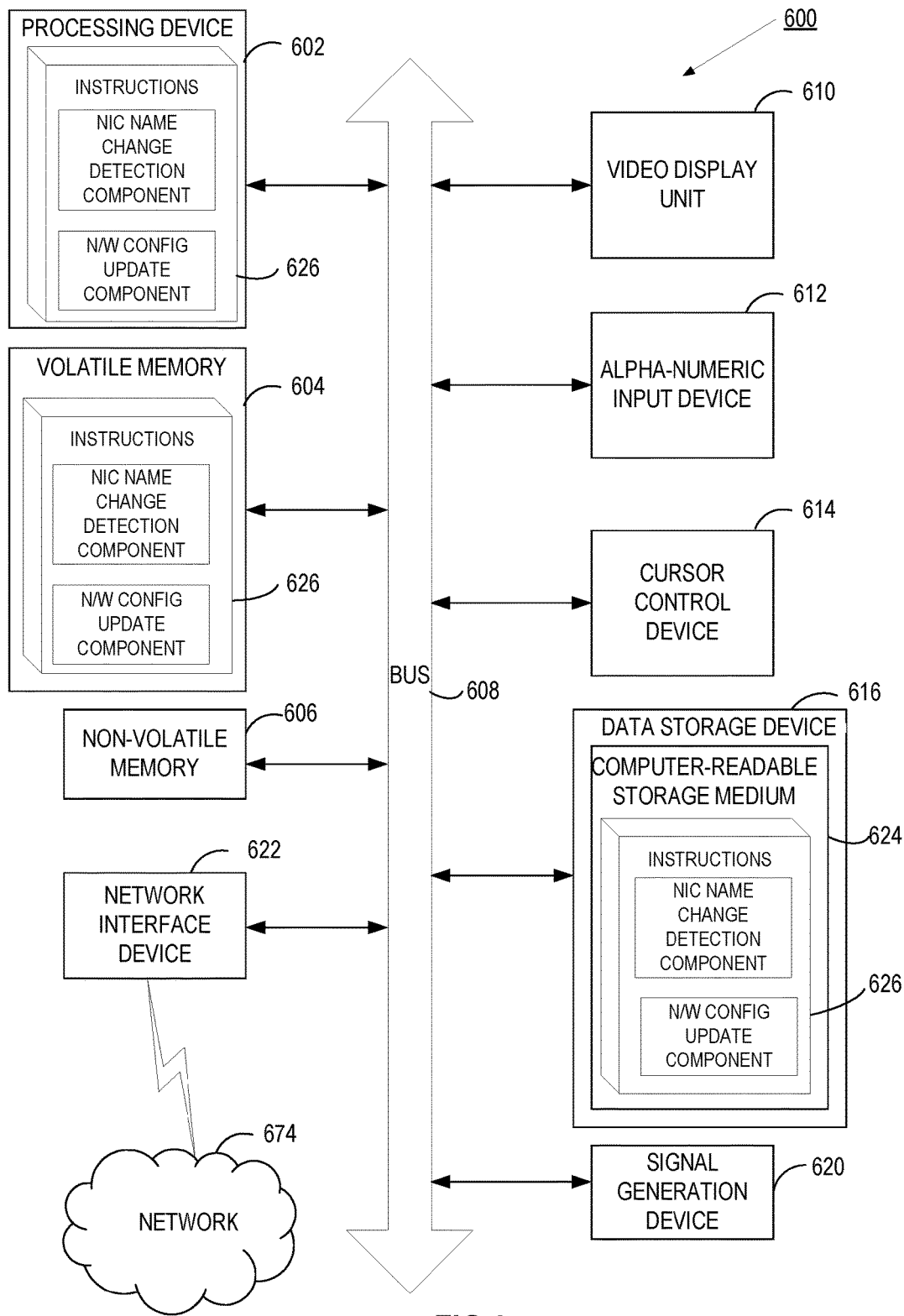
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to a computing device, such as management server 110 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for a NIC name change detection component 112 and network configuration update component 114 of FIG. 1 for implementing methods 300 or 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "identifying," "updating," "saving," "determining," "transmitting," "invoking," "associating," "providing," "storing," "performing," "utilizing," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
receiving new network configuration data comprising first network interface controller (NIC) configuration data for a NIC device that is identified by a permanent identifier (ID), wherein the new network configuration data comprises a first NIC name corresponding to the permanent ID, and wherein the NIC device is a single root-input/output virtualization (SR-IOV)-enabled NIC device;
identifying the permanent ID of the NIC device in current network configuration data comprising second NIC configuration data for the NIC device;
identifying a second NIC name corresponding to the permanent ID of the NIC device in the current network configuration data;
responsive to the first NIC name being different than the second NIC, updating, by a processing device, the first NIC configuration data in the new network configuration data to be the same as the second NIC configuration data; and
saving, by the processing device, the updated new network configuration data as the current network configuration data.

2. The method of claim 1, wherein the first and second NIC configuration data comprises logical networks associated with the NIC device.

3. The method of claim 1, wherein the first and second NIC configuration data comprises an SR-IOV configuration associated with the NIC device.

4. The method of claim 3, wherein the SR-IOV configuration comprises networks to which the NIC device is connected and a number of virtual functions (VFs) of the NIC device.

5. The method of claim 1, wherein the permanent ID comprises at least one of a peripheral component interconnect (PCI) address of the NIC device, a media access control (MAC) address of the NIC device, or a hardware ID of the NIC device.

6. The method of claim 1, wherein the new network configuration data is received from a hypervisor executing on a host machine comprising the NIC device.

7. The method of claim 6, further comprising:
receiving an event from the hypervisor associated with hardware updates affecting the hypervisor; and
responsive to receiving the event, requesting a device list from the hypervisor, wherein the device list comprises the new network configuration data.

8. The method of claim 6, further comprising causing the hypervisor to update network configurations corresponding to the NIC device at the host machine consistent with the saved current network configuration data.

9. The method of claim 8, wherein causing the hypervisor to update the network configuration of the NIC device further comprises transmitting instructions to the hypervisor to update one or more bridges to correctly correspond to the NIC device per the saved current network configuration data.

10. A non-transitory machine-readable storage medium storing instructions that cause a processing device to:
determine that current network configuration data has been updated in response to a network interface controller (NIC) name change of a NIC device, wherein the NIC device is a single root-input/output virtualization (SR-IOV)-enabled NIC device;
identify, by the processing device, a NIC name, a permanent identifier (ID), and NIC configuration data corresponding to the NIC device that has been updated in the current network configuration data;
generate, by the processing device, instructions to cause a hypervisor to update the identified NIC configuration data for the NIC device that corresponds to the permanent ID; and
transmit the generated instructions to the hypervisor.

11. The non-transitory machine-readable storage medium of claim 10, wherein the hypervisor is executed on a host machine that is separate from a computing device comprising the processing device.

12. The non-transitory machine-readable storage medium of claim 10, wherein the NIC configuration data comprises logical networks associated with the NIC device.

13. The non-transitory machine-readable storage medium of claim 10, wherein the second NIC configuration data comprises an SR-IOV configuration associated with the NIC device, and wherein the SR-IOV configuration comprises networks to which the NIC device is connected and a number of virtual functions (VFs) of the NIC device.

14. The non-transitory machine-readable storage medium of claim 10, wherein the permanent ID comprises at least one of a peripheral component interconnect (PCI) address of the NIC device, a media access control (MAC) address of the NIC device, or a hardware ID of the NIC device.

15. The non-transitory machine-readable storage medium of claim 10, wherein the permanent ID of the NIC device is utilized to determine that the NIC name change occurred and to initiate an update of the current network configuration data.

16. A system comprising,
a memory; and
a processing device operatively coupled to the memory, the processing device to:
receive new network configuration data comprising first network interface controller (NIC) configuration data for a NIC device that is identified by a permanent identifier (ID), wherein the new network configuration data comprises a first NIC name corresponding to the permanent ID, and wherein the NIC device is a single root-input/output virtualization (SR-IOV)-enabled NIC device;
identify the permanent ID of the NIC device in current network configuration data comprising second NIC configuration data for the NIC device;
identify a second NIC name corresponding to the permanent ID of the NIC device in the current network configuration data;
responsive to the first NIC name being different than the second NIC, update the first NIC configuration data in the new network configuration data to be the same as the second NIC configuration data;
save the updated new network configuration data as the current network configuration data; and
transmit instructions to a host machine hosting the NIC device, the instructions to cause NIC configurations of the NIC device to be updated consistent with the saved current network configuration data.

17. The system of claim 16, wherein the first NIC configuration data comprises logical networks associated with the NIC device.

18. The system of claim 16, wherein the second NIC configuration data comprises an SR-IOV configuration associated with the NIC device.

19. The system of claim 18, wherein the SR-IOV configuration comprises networks to which the NIC device is connected and a number of virtual functions of the NIC device.

20. The system of claim 16, wherein the permanent ID comprises at least one of a peripheral component interconnect (PCI) address of the NIC device, a media access control (MAC) address of the NIC device, or a hardware ID of the NIC device.

* * * * *